United States Patent [19]

Weise

[11] 3,848,630

[45] Nov. 19, 1974

[54] RELIEF VALVE
[75] Inventor: Irvin B. Weise, Bellaire, Tex.
[73] Assignee: Anderson, Greenwood & Company, Houston, Tex.
[22] Filed: Oct. 2, 1973
[21] Appl. No.: 402,739

Related U.S. Application Data
[63] Continuation of Ser. No. 220,769, Jan. 26, 1972, abandoned.

[52] U.S. Cl............. 137/475, 137/102, 251/24, 251/DIG. 1
[51] Int. Cl............................................. F16k 31/36
[58] Field of Search............ 137/469, 475–478, 137/488, 489, 492, 492.5, 604; 251/24

[56] References Cited
UNITED STATES PATENTS

| | | | |
|---|---|---|---|
| 2,277,656 | 3/1942 | Falls | 137/478 |
| 2,557,536 | 6/1951 | Drane et al. | 137/469 |
| 2,628,633 | 2/1953 | Folmsbee | 137/469 |
| 2,871,877 | 2/1959 | Work | 137/469 |
| 2,890,714 | 6/1959 | Greenwood et al. | 251/24 X |
| 3,586,287 | 6/1971 | Knobel | 251/24 |

Primary Examiner—Robert G. Nilson
Attorney, Agent, or Firm—Jack R. Springgate; Joe E. Edwards; M. H. Gay

[57] ABSTRACT

A pilot valve having a body with three ports therein and communication through the body to all ports with a valve seat and valve member biased toward engagement with the valve seat for controlling flow from two ports to the third port. The valve member includes a hex-shaped, annular holder plate, an O-ring seating seal positioned in a groove in the holder plate and a retainer plug engaging within said O-ring and being responsive to pressure upstream of said valve seat to retain said O-ring in sealing engagement with the valve seat when the valve member is closing flow through the valve seat and a diaphragm is provided to exert a force against the biasing force on the valve member as soon as the valve member cracks open. The pilot valve may include a balancing diaphragm to render the valve member insensitive to back pressure. This abstract is neither intended to define the invention of the application which, of course, is measured by the claims, nor is it intended to be limiting as to the scope of the invention in any way.

6 Claims, 6 Drawing Figures

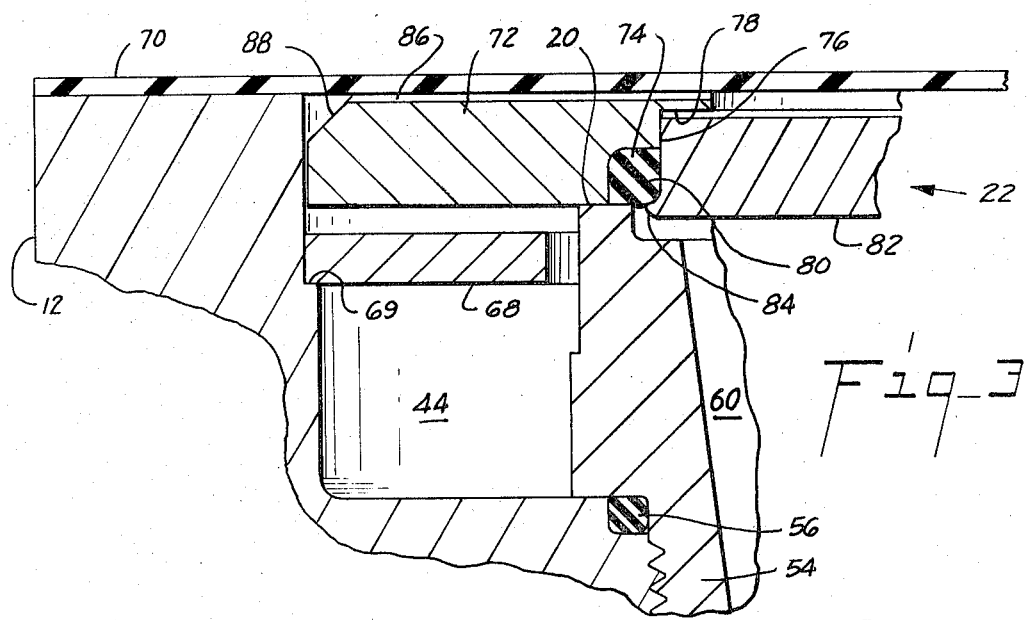
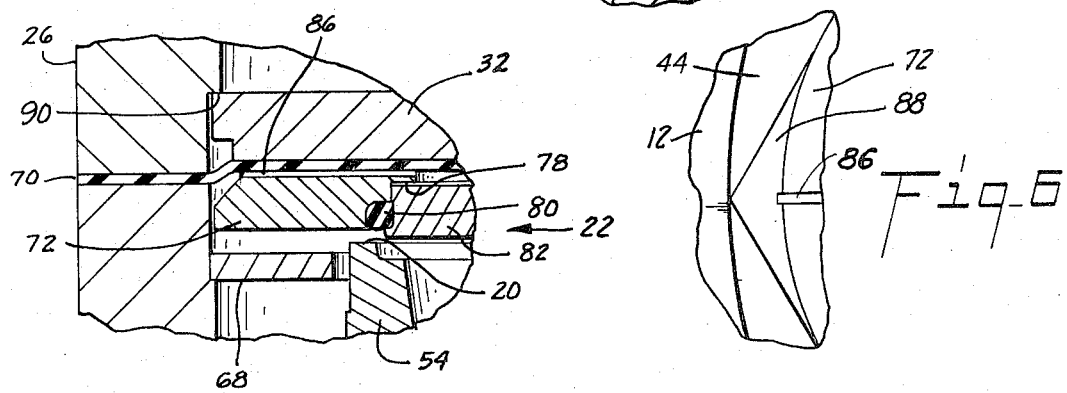
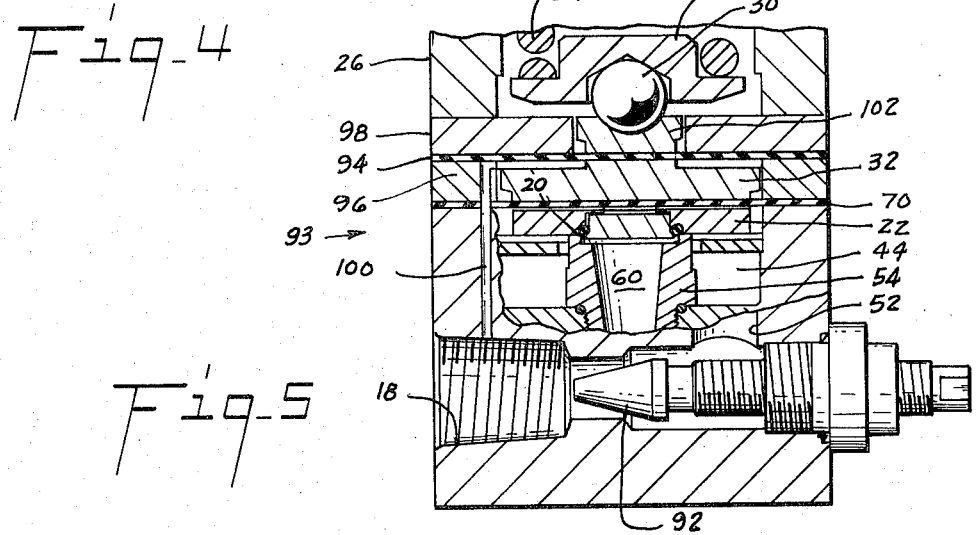

RELIEF VALVE

CROSS-REFERENCE TO RELATED APPLICATION

The present application is a continuation of prior copending application Ser. No. 220,769 filed Jan. 26, 1972, now abandoned.

SUMMARY

The present invention relates to an improved pilot valve for controlling the operation of another valve.

Pilot valves receive a fluid at the pressure from the chamber or line in the system which is to be controlled by a main valve which main valve is controlled by the pilot valve. One type of pilot valve of the prior art generally transmits the pressure fluid to the dome or control pressure responsive means of the main valve and when the pressure being controlled exceeds the preselected maximum, the pilot valve exhausts the pressure fluid from the dome to allow the main valve to open and relieve such excess pressure from the system being protected.

An object is to provide an improved pilot valve which remains bubble tight when it is closed.

A further object is to provide an improved pilot valve which is insensitive to back pressure.

Still another object is to provide an improved pilot valve which has improved snap action on opening and an adjustment for the control of blowdown.

A still further object is to provide an improved pilot valve which is free of problems of the valve member sticking and failing to properly seat on the valve seat.

BRIEF DESCRIPTION OF THE DRAWINGS

These and other objects and advantages of the present invention are hereinafter disclosed and explained in reference to the drawings wherein:

FIG. 3 is a detail partial sectional view of the valve member in engagement with the valve seat.

FIG. 4 is a partial detail sectional view similar to FIG. 3 showing the valve member out of engagement with the valve seat.

FIG. 5 is a partial sectional view of a modified form of the present invention which is balanced to render it insensitive to back pressure.

FIG. 6 is a partial sectional view to illustrate the shape of the valve member in relation to diaphragm chamber.

DESCRIPTION OF THE PREFERRED EMBODIMENTS

Figure 1:
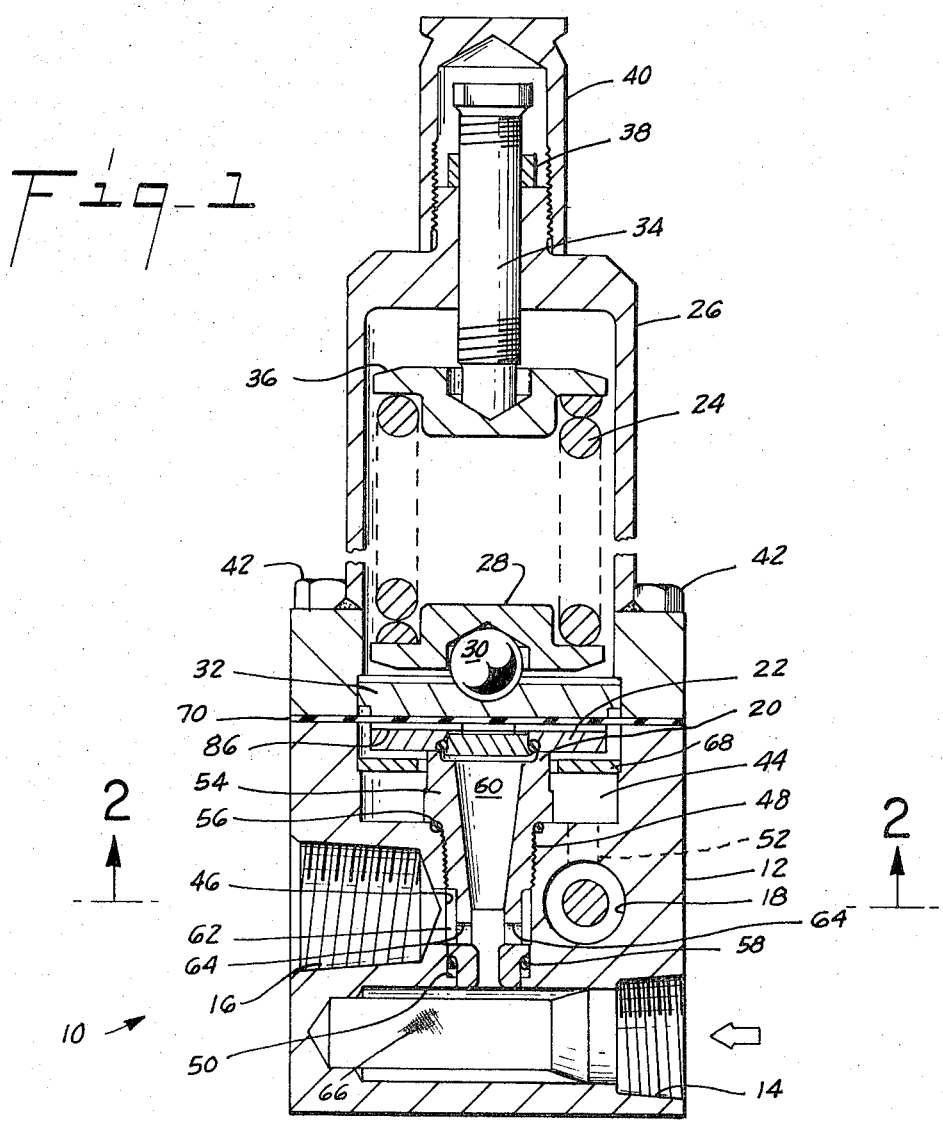
FIG. 1 is a sectional view of the improved pilot valve of the present invention.

The improved pilot valve of the present invention has an improved valve member structure which seats at all pressures below opening pressure, is balanced so that a back pressure does not affect the opening of the pilot valve, moves freely in opening and closing the valve seat and utilizes the fluid pressure build-up in the diaphragm chamber upon opening to assure that the valve member snaps to full open position.

As shown in the drawings, the improved pilot valve 10 of the present invention includes the body 12 having inlet port 14, control port 16, outlet or vent port 18, communication between the ports, and a valve seat 20 between the outlet port 18 and the other two ports, a valve member 22 and means for biasing the valve member 22 toward the valve seat 20. Such biasing means includes the spring 24 positioned within the bonnet 26 exerting the biasing force on valve member 22 through spring plate 28, ball 30 and back-up plate 32. The biasing force exerted by spring 24 is adjusted by the threaded member 34 which is threaded through the upper end of the bonnet 26 and engages the spring plate 36 which is in engagement with the end of the spring 24 away from the valve member 22. Nut 38 is provided to lock threaded member 34 in its desired position. Cap 40 is threaded onto bonnet 26 in covering relationship to threaded member 34. Bonnet 26 is secured to body 12 by the screws 42.

As can best be seen in FIG. 1, the body 12 defines the diaphragm chamber 44 with the bore 46 which is threaded at 48 extending into communication with control port 16 and inlet port 14. The shoulder 50 facing diaphragm chamber 44 is positioned between the intersections of bore 46 with control port 16 and with inlet port 14. The passage 52 communicates from diaphragm chamber 44 to the outlet port 18.

The nozzle 54 is threaded into the threaded portion of bore 46 and is provided with seals 56 and 58, which may be O-rings, to prevent flow of fluid between the exterior of nozzle 54 and the interior of bore 46. Valve seat 20 is defined by the outer end of nozzle in diaphragm chamber 44. The interior of nozzle 54 defines a venturi flow passageway 60 communicating between inlet port 14 and valve seat 20. The exterior of nozzle 54 at port 16 coacts with the bore 46 to define the annular recess 62 and nozzle 54 is provided with the radial ports 64 communicating between annular recess 62 and venturi flow passageway 60.

The inlet port 14 includes the screen 66 to filter solids out of the fluids flowing therein.

Annular baffle ring 68 is positioned on the outwardly facing shoulder 69 in diaphragm chamber. The baffle ring functions to convert kinetic or flowing energy into static pressure when there is flow through valve seat 20 to improve the popping characteristics or snap action of valve member 22. Such baffle ring 68 is very effective when the pilot valve 10 is handling liquids.

The diaphragm 70 is positioned between bonnet 26 and body 12 and defines the other side of the diaphragm chamber 44. Also valve member 22 abuts the side of diaphragm 70 and back-up plate 32 abuts the other side of diaphragm 70. The diaphragm 70 is responsive to the pressure build-up in diaphragm chamber 44 whenever valve member 22 cracks open and by virtue of its relatively large diameter will provide a force opposing the biasing force of spring 24 to assure that valve member 22 snaps to full open position once it cracks off valve seat 20.

Valve member 22 includes the holder plate 72, which defines the groove 74 surrounding the bore 76 which includes the shoulder 78, the O-ring 80 and the retainer plug 82 which is positioned within O-ring 80 with its outwardly extending flange 84 in engagement with a portion of O-ring 80 to assure that it is retained in the groove 74. The flange 78 limits the movement of plug 82 to assure that O-ring 80 is held in its position without being subjected to an excess of force from plug 82 to prevent damage to O-ring 80.

As best seen from FIG. 3, retainer plug 82 has a diameter smaller than the diameter of valve seat 20 so that when valve member 22 is seated on valve seat 20 it is exposed to the fluid pressure within passageway 60 on one side and by the equalizing grooves 86 in holder plate 72 to the pressure within diaphragm chamber 44 on the other side. This creates a pressure differential on retainer plug 82 urging it more tightly against O-ring 80 until plug 82 seats on shoulder 78. This force on O-ring 80 assures that it remains in contact with valve seat 20 as long as valve member 22 remains seated and thus prevents any bleeding of pressure fluid between O-ring 80 and valve seat 20.

Holder plate 72 is preferably made of hexagonal shaped material as best shown in FIG. 6, so that the corners provide a guiding of the valve member 22 in its movement and the flats are spaced from the wall of chamber 44 to allow pressure fluids to be exerted on the diaphragm. This utilization of a hexagonal shape for holder plate 72 avoids sticking problems since the valve member 22 does not require a closely guided spindle or sleeve. The corners of plate 72 are beveled as shown at 88 in FIG. 3 to prevent damage to diaphragm 70 as valve member 22 moves to full open position. Diaphragm 70 is also protected from excess movement by the engagement of back-up plate 32 with the shoulder 90 within bonnet 26.

Figure 2:
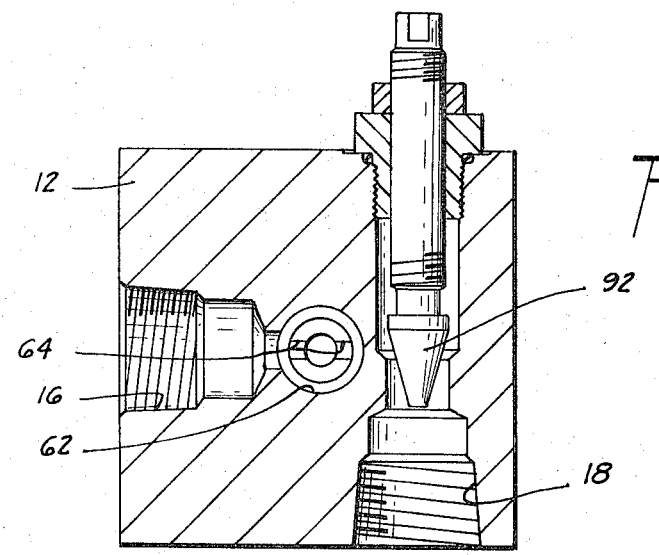
FIG. 2 is a transverse sectional view of the pilot valve taken along line 2—2 in FIG. 1 to illustrate the blowdown adjusting device in the outlet port and the control port and its communication passage to the interior of the venturi section.

As shown in FIG. 2, the needle valve 92 is positioned to control the flow from diaphragm chamber 44 through the passage 52 and out the outlet port 18. Needle valve 92 is provided to control the blowdown. By adjusting the needle valve inwardly, the effective flow area is reduced and the blowdown is increased and the system pressure at which the pilot valve will close is reduced. The needle valve 92 being positioned in the outlet controls the exhaust flow and thus controls the degree of pressure build-up in diaphragm chamber 44 after valve member 22 opens flow through valve seat 20.

The modified pilot valve 93 shown in FIG. 5 is substantially identical to the pilot valve previously described except that the balancing diaphragm 94 is secured around its edges between the spacer plates 96 and 98 which are secured between the bonnet 26 and the body 12. All parts of the pilot valve 93 shown in FIG. 5 which are identical with the parts of pilot valve 10 are given the same numbers. It should be noted that FIG. 5 is a composite of sectional views to illustrate the relationship between the balancing structure and the outlet port 18. Passage 100 through body 12, diaphragm 70 and spacer plate 96 provides communication between outlet port 18 and the underside of diaphragm 94. Spacer plate 96 is annular in shape to provide a bore in which back-up plate 32 moves. Spacer plate 98 is also annular in shape to provide a bore in which the plug 102 moves. The effective diameter of diaphragm 94 acting on plug 102 is the same as the effective diameter of valve seat 20. Thus, when a back pressure builds up in outlet 18, this pressure is transmitted to the diaphragm 94 to provide a force against the force of spring 24 which exactly balances the force on valve member 22 to thus render the pilot valve 93 insensitive to back pressure in the exhaust or outlet.

In operation, the pilot valve 1 is connected with pressure system and a main relief valve to control the operation of the main relief valve responsive to the pressure within the system and thus controls the system pressure. Pressure from the system is conducted to the inlet port 14 and dome or control pressure is conducted from the control port 16 to the dome or pressure responsive means for the main relief valve. Thus, the system pressure is utilized under normal conditions to retain the main relief valve closed. When the system pressure reaches the preselected maximum desired system pressure, pilot valve 10 opens to vent pressure fluid from the main valve dome through the pilot valve. This relief allows the main valve to open and relieve pressure from the system. As previously stated, the amount of blowdown is controlled by the setting of the needle valve 92. When valve member 22 agains seats on valve seat 20, the flow of fluid is directed from inlet port 14 to control port 16 and to the main valve dome to close the main valve.

The valve member 22 snaps to full open position once it cracks open because pressure is allowed to build up in diaphragm chamber 44 and even though such pressure is usually quite low, the large effective area of diaphragm 70 is sufficient to assure that valve member 22 snaps to full open position. The baffle ring 68 assists in building pressure in diaphragm chamber 44 to assure that valve member 22 snaps open. The opening pressure of valve member 22 is preselected by the adjustment of the threaded member 34 to either compress or relax the spring 24 and thus set the spring force biasing valve member 22 toward seated position. Nut 38 is used to lock the threaded member 34 in its position.

The pilot valve of the present invention provides an improved valve member which is guided in its movement and is free from sticking, and further provides a bubble tight seat with its pressure responsive seal and utilizes an O-ring to provide such simple seat seal. The valve member being a plate shape will always align itself with the plane of valve seat 20 and does not require separate articulating seating members or special guiding elements. It thus is smooth and free in its movement within diaphragm chamber. The baffle ring in the diaphragm chamber of the pilot valve of the present invention converts the kinetic energy of the fluid flowing through the valve seat 20 into static pressure to increase the pressure within diaphragm chamber 44 as soon as valve member 22 cracks off valve seat 20 to cause valve member 22 to move to full open position and provide improved snap action even when controlling liquid. Also the improved pilot valve may be modified to render it insensitive to back pressure.

What is claimed is:

1. A pilot valve, comprising
 a valve body,
 said valve body defining an inlet port, a control pressure port, an outlet port, and a communication from said inlet port to said control pressure port and to said outlet port,
 means in said communication defining a valve seat between said outlet port and said other two ports,
 a valve member positioned within said communication and adapted to engage and disengage from said valve seat to control flow therethrough, means biasing said valve member toward engagement with said valve seat, pressure responsive means exposed to the fluid pressure immediately downstream of said valve member and having an effective pressure area larger than said valve member, said pressure responsive means being associated with said valve member and said biasing means to exert a force against said baising means when said valve member cracks open to assure that said valve member snaps to full open position on opening, said body defining a diaphragm chamber surrounding said valve seat and in communication with said outlet port, said pressure responsive means being a diaphragm exposed to the fluid pressure within said diaphragm chamber, and means positioned within said diaphragm chamber for converting the kinetic energy of fluid flowing therein when said valve member is out of engagement with said valve seat to static pressure to assure a positive snap action of said valve member to full open position when it first opens, said diaphragm chamber being cylindrical, said valve member being hexagonal and moving within said diaphragm chamber with the corners of said hexagonal valve member lightly guiding the movement of said valve member within said diaphragm chamber without binding and sticking.

2. A pilot valve, comprising a valve body, said valve body defining an inlet port, a control pressure port, an outlet port, and a communication from said inlet port to said control pressure port and to said outlet port, means in said communication defining a valve seat between said outlet port and said other two ports, a valve member positioned within said communication and adapted to engage and disengage from said valve seat to control flow therethrough, means biasing said valve member toward engagement with said valve seat, pressure responsive means exposed to the fluid pressure immediately downstream of said valve member and having an effective pressure area larger than said valve member, said pressure responsive means being associated with said valve member and said biasing means to exert a force against said biasing means when said valve member cracks open to assure that said valve member snaps to full open position on opening, said body defining a diaphragm chamber surrounding said valve seat and in communication with said outlet port, said pressure responsive means being a diaphragm exposed to the fluid pressure within said diaphragm chamber, means positioned within said diaphragm chamber for converting the kinetic energy of fluid flowing therein when said valve member is out of engagement with said valve seat to static pressure to assure a positive snap action of said valve member to full open position when it first opens, and a pressure energized seating seal, said valve member including a holder ring being annular in shape and having a groove surrounding its inner bore, an O-ring positioned within said groove, and a retainer plug positioned within said O-ring and having an outwardly extending flange partially engaging said O-ring, said retainer plug being exposed to the differential pressure between the fluid pressure within said valve seat and the fluid pressure within said diaphragm chamber and being urged into tighter engagement with said O-ring responsive to said pressure differential to provide said pressure energized seal and to thereby assure tight sealing engagement of said O-ring against said valve seat.

3. A pilot valve, comprising a valve body, said valve body defining an inlet port, a control pressure port, an outlet port, and a communication from said inlet port to said control pressure port and to said outlet port, means in said communication defining a valve seat between said outlet port and said other two ports, a valve member positioned within said communication and adapted to engage and disengage from said valve seat to control flow therethrough, means biasing said valve member toward engagement with said valve seat, pressure responsive means exposed to the fluid pressure immediately downstream of said valve member and having an effective pressure area larger than said valve member, said pressure responsive means being associated with said valve member and said biasing means to exert a force against said biasing means when said valve member cracks open to assure that said valve member snaps to full open position on opening, and means for balancing forces on said valve member to render said valve member insensitive to back pressure, said balancing means including, a diaphragm exposed to the pressure within said outlet port and connected to exert a force on said biasing means in the direction of opening of said valve member, said diaphragm having an effective pressure area substantially equal to the area of said valve seat to provide a balancing force equal and opposite to the force on said valve member of the back pressure in said outlet port.

4. A pilot valve, comprising a valve body, said valve body defining an inlet port, a control pressure port, an outlet port, and a communication from said inlet port to said control pressure port and to said outlet port, means in said communication defining a valve seat between said outlet port and said other two ports, a valve member positioned within said communication and adapted to engage and disengage from said valve seat to control flow therethrough, means biasing said valve member toward engagement with said valve seat, pressure responsive means exposed to the fluid pressure immediately downstream of said valve member and having an effective pressure area larger than said valve member, said pressure responsive means being associated with said valve member and said biasing means to exert a force against said biasing means when said valve member cracks open to assure that said valve member snaps to full open position on opening, and adjustable means associated with said outlet port for variably restricting the flow therethrough to control blowdown, said body defining a cylindrical diaphragm chamber surrounding said valve seat, said valve member being unrestrained against lateral movement by said diaphragm and including means for guidance by the wall of said diaphragm chamber to limit lateral movement of said valve member and to allow a limited angular movement with respect to said valve seat to thereby permit proper alignment of said valve member with said valve seat when said valve member is seated.

5. A pilot valve according to claim 4, wherein said valve member includes a plate member being generally free to move within said diaphragm chamber to assure alignment with said valve seat when said valve member is in engagement therewith to provide a sealed closure of said valve seat.

6. A pilot valve according to claim 4, wherein said valve member includes a first member, a second member, a seating ring positioned between said first and second members, said second member being exposed on one side to pressure upstream of said valve seat and on the other side to pressure downstream of said valve seat, said second member being movable with respect to said first member responsive to pressure differential exerted on said second member to squeeze said seating ring into sealing engagement with said valve seat.

* * * * *